United States Patent
Nishioka et al.

(10) Patent No.: US 7,075,865 B2
(45) Date of Patent: Jul. 11, 2006

(54) OPTICAL PICKUP

(75) Inventors: Sumito Nishioka, Ikoma-gun (JP);
Nobuo Ogata, Nara (JP)

(73) Assignee: Sharp Kabushi Kaisha, Osaka (JP)

( * ) Notice: Subject to any disclaimer, the term of this patent is extended or adjusted under 35 U.S.C. 154(b) by 411 days.

(21) Appl. No.: 10/461,048

(22) Filed: Jun. 13, 2003

(65) Prior Publication Data

US 2003/0235137 A1      Dec. 25, 2003

(30) Foreign Application Priority Data

Jun. 21, 2002 (JP) ............................. 2002-181877

(51) Int. Cl.
*G11B 7/00* (2006.01)

(52) U.S. Cl. .............................. 369/44.37; 369/112.01; 369/112.03

(58) Field of Classification Search ..................... None
See application file for complete search history.

(56) References Cited

U.S. PATENT DOCUMENTS 6,574,182 B1 * 6/2003 Yamada et al. ........ 369/112.03
6,618,344 B1 * 9/2003 Funato .................. 369/112.15

FOREIGN PATENT DOCUMENTS

JP      8-55363/1996      2/1996

OTHER PUBLICATIONS

"Extended Abstracts" No. 3 (The Japan Society of Applied Physics and Related Societies, The 43rd Spring Meeting, 1996, pp. 1084, Lecture No. 28a-F-7). English translation provided.

* cited by examiner

*Primary Examiner*—Muhammad Edun
(74) *Attorney, Agent, or Firm*—Peter J. Manus; David G. Conlin; Edwards Angell Palmer & Dodge LLP

(57) ABSTRACT

An optical pickup includes a semiconductor laser for emitting light at a wavelength $\lambda 1$ and a semiconductor laser for emitting light at a different wavelength $\lambda 2$ from the wavelength $\lambda 1$. The light at the wavelength $\lambda 1$ transmitted through an objective lens forms a light-collecting spot on an optical disk to record/reproduce information thereon. The light at the wavelength $\lambda 2$ transmitted through the objective lens forms a light-collecting spot on an optical disk to record/reproduce information thereon, the two optical disks having different substrate thicknesses. Between the semiconductor laser and the objective lens is there provided a combination-type diffractive element fabricated by combining two raw materials having different refractive index behaviors in relation to wavelength at a combining plane shaped as a grating. The structure facilitates good recording/reproduction on the two types of recording media irrespective of the reproduction wavelengths or substrate thicknesses of the recording media.

17 Claims, 10 Drawing Sheets

WAVE LENGTH=650nm

WAVE LENGTH=650nm

OPTICAL PICKUP

FIELD OF THE INVENTION

The present invention relates to optical pickups provided in optical recording/reproducing devices to record/reproduce information on an optical recording medium, especially to those which record/reproduce information on optical recording media of differing substrate thicknesses using differing wavelengths.

BACKGROUND OF THE INVENTION

Optical disk players capable of reading information stored on DVD (Digital Video Disc) and other optical recording media are examples of optical recording/reproducing devices. Although 4.7-GB DVDs have been recently introduced to the market, strong demand still exists for higher density package media (next generation high density optical disk). A lot of effort has been dedicated to address the need. It is well known that effective ways to enhance recording density are reducing the wavelength of the light source and increasing the NA of the objective lens. Current standards for next generation high density optical disks are an objective lens with a numerical aperture (NA) of 0.85 and a light source at a wavelength of 405 nm, which are improvements over 0.6 and 650 nm respectively for conventional DVDs. The specifications are targeting a smaller focused spot, hence a higher recording density.

Increasing the NA of an objective lens leads to quick increases in coma aberration, a phenomenon which occurs when the optical disk is tilted. This in turn raises an issue of poor quality light convergence to the focused spot. The coma aberration caused by a tilt of the optical disk is proportional to the thickness of the optical transmissive layer from the light entering plane to the information recording plane. Accordingly, increases in coma aberration caused by an increasing NA can be restrained by reducing the thickness of the optical transmissive layer of the optical disk. This approach forms the basis of a current proposal to reduce the thickness of the optical transmissive layer of the next generation high density optical disk from a conventional DVD's 0.6 mm to 0.1 mm.

Incidentally, the next generation high density optical disk is required to be compatible with DVDs. Stated differently, the recording/reproducing device for the next generation high density optical disk is naturally required to be capable of recording/reproducing data on DVDs which are now in widespread use.

However, as described above, the next generation high density optical disk differs from the DVD in thickness of the optical disk substrate, making it difficult to ensure compatibility. An ordinary objective lens is designed assuming a substrate thickness of a particular optical disk; if the lens is used with an optical disk having a vastly different substrate thickness from the designed value, a spherical aberration, hence poor light convergence occurs at the focused spot.

Methods of solving such problems in the recording/reproduction on the optical disk which are caused by a difference in substrate thickness are disclosed in Published Unexamined Patent Application 8-55363 (Tokukaihei 8-55363/1996, published on Feb. 27, 1996; "the first conventional example") and Proceedings No. 3, Page 1084, for Lecture No. 28aF-7 in 43$^{rd}$ Conference of Applied Physics Society (the Proceedings distributed and Conference held on Mar. 26, 1996; "the second conventional example"). The prior art documents describe a method of rendering a DVD having a substrate thickness of 0.6 mm for use with a wavelength of about 650 nm and a CD (Compact Disc) having a substrate thickness of 1.2 mm for use with a wavelength of about 780 nm compatible with each other.

The first conventional example employs two light sources with wavelengths of 635 nm and 780 nm. The 635-nm light source is located at the focal point of the collimating lens to shine parallel light. The 780-nm light source is however located a little displaced from the focal point of the collimating lens, so as to shine somewhat diverging light. The arrangement of the lenses enables correction of the spherical aberration caused by different substrate thicknesses. The second conventional example employs two light sources with wavelengths 635 nm of 785 nm. In the path of the light flux hitting the objective lens is provided a diffractive element effective only to a light flux at a wavelength of 785 nm. The lens/grating device combination enables correction of the spherical aberration caused by different substrate thicknesses.

However, it entails the following problems to apply the conventional techniques to make the next generation high density optical disk compatible with the DVD.

The first conventional example, when applied to the compatibility issue between the DVD and the CD where the two wavelengths employed have a small difference and the objective lens has a small numerical aperture, reduces spherical aberration to some extent. However, when applied to the compatibility issue between the next generation high density optical disk and the DVD where the two wavelengths has a large difference and the objective lens has a high numerical aperture, the technique fails to correct aberrations which occurs to divergent incident light and poorly converges a diverging flux of incident light to the focused spot. A method to prevent this from happening is to provide a correction lens in the path of diverging light, where the correction lens must be placed only in that path of diverging light so that correction is effective only for diverging light, not for parallel light. The correction lens cannot therefore be driven integrally with the objective lens, making it difficult to maintain performance when the objective lens is moved.

The second conventional example, employing a diffractive element for correction purposes, is able to utilize light only with reduced efficiency, because the light used to address the compatibility issue between the next generation high density optical disk and the DVD come in two wavelengths: 405-nm blue light and 650-nm red light. The technique therefore requires a laser source with a high output power, which raises a problem of high power consumption. Such a low efficiency technique is not suited to an application in an optical pickup, also in view of the need for high output power in recording/erasing information on an optical disk.

SUMMARY OF THE INVENTION

The present invention has an objective to provide a versatile optical pickup capable of recording/reproducing information on two types of recording media in a satisfactory manner irrespective of the reproduction wavelengths or substrate thicknesses of the recording media.

The optical pickup in accordance with the present invention is an optical pickup for forming a light-collecting spot on an information recording plane to optically record/reproduce information, and is characterized in that it includes:

a first light source for emitting light at a first wavelength $\lambda 1$;

a second light source for emitting light at a different, second wavelength λ2 from the first wavelength λ1;

light collecting means for forming a light-collecting spot on an information recording plane of a first recording medium from the light at the wavelength λ1 and forming a light-collecting spot on an information recording plane of a second recording medium from the light at the wavelength λ2, the first and second recording media having different substrate thicknesses; and a diffractive element disposed between the first and second light sources and the light collecting means, wherein the diffractive element is of a combination type fabricated by combining two different raw materials at a combining plane which is shaped as a diffraction grating.

The optical pickup in accordance with the present invention is an optical pickup provided with two light sources which emit light at different wavelengths to record/reproduce information on two types of recording media which have different substrate thicknesses, such as, the DVD and the next generation high density optical disk. Between the two light sources and light collecting means, such as an objective lens, forming the light-collecting spot is there disposed a diffractive element through which the light from the light sources is transmitted. In the present invention, the diffractive element is termed the combination-type diffractive element, because it is fabricated by combining two different two raw materials. The combination-type diffractive element has a combining plane between the two raw materials which is shaped to act as a grating.

The combination-type diffractive element is fabricated by combining two raw materials having different refractive index behaviors in relation to wavelength. Depending on the selection of the raw materials, the diffractive element is capable of correcting various aberrations which occur to the light at the wavelengths passing through the diffractive element, or in other words, rendering light passing therethrough substantially parallel without diffusing it. Further, the combination-type diffraction grating has a combining plane at which the two raw materials are combined and which is shaped as a diffraction grating; the position can therefore be varied of the light-collecting spot formed by the light transmitted through the light collecting means.

Since the combination-type diffractive element is fabricated from raw materials selected so that the materials have nearly equal refractive indices at one of the wavelengths, the configuration improves utilization efficiency of the light at the wavelength. The light at the other wavelength achieves good recording/reproduction with a recording medium, because the grating is shaped so as to form a light-collecting spot on the information recording plane of the recording medium. The structure enables a good light-collecting spot to be formed both on the first and second recording media for which light is used in recording/reproduction at two wavelengths which differ vastly from each other, irrespective of the wavelengths or substrate thicknesses of the recording media.

Additional objects, advantages and novel features of the invention will be set forth in part in the description which follows, and in part will become apparent to those skilled in the art upon examination of the following or may be learned by practice of the invention.

DESCRIPTION OF THE EMBODIMENTS

The following will describe an embodiment in accordance with the present invention in reference to FIG. 1 through FIG. 10.

Figure 1:
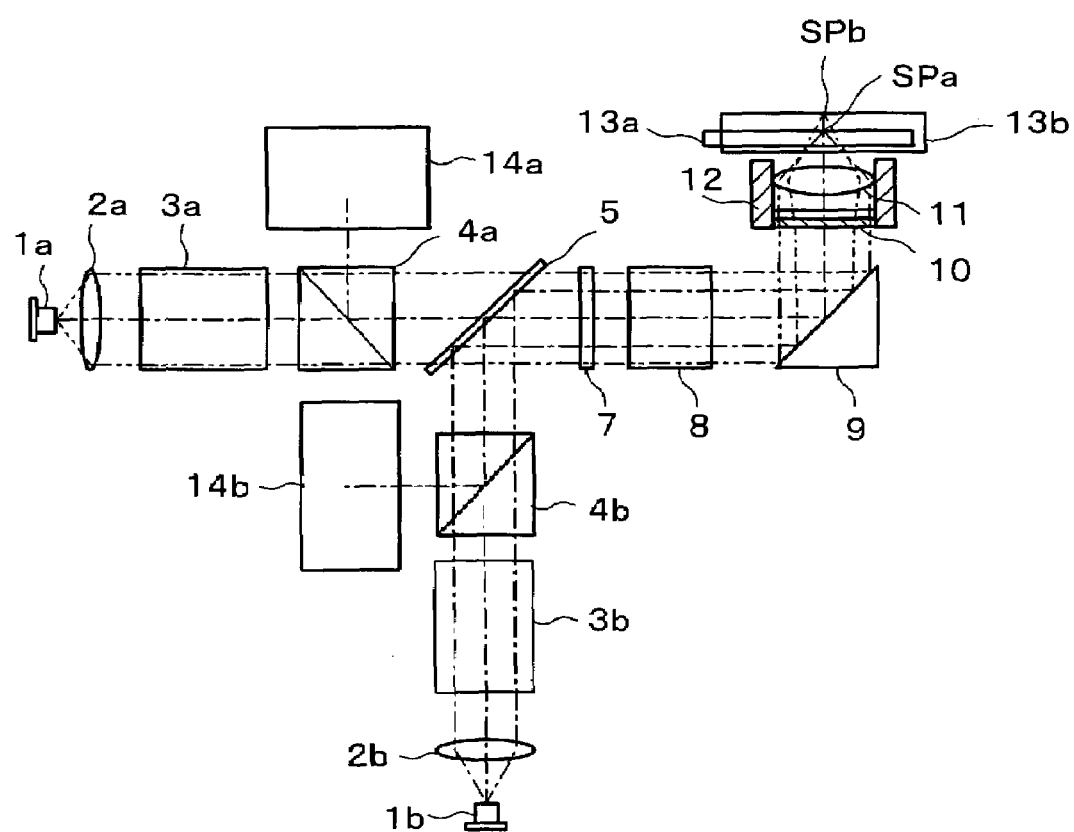
FIG. 1 is a schematic representation of the arrangement of an optical pickup of an embodiment in accordance with the present invention.
Figure 2:
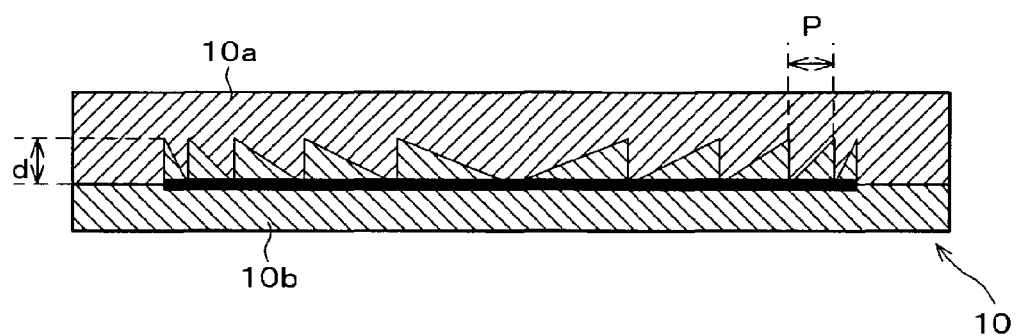
FIG. 2(a) is a cross section of a combination-type diffractive element showing its sawtooth combining plane as viewed in the direction of the optical axis.
FIG. 2(b) is a cross section of another combination-type diffractive element showing its step-like combining plane as viewed in the direction of the optical axis.
Figure 2:
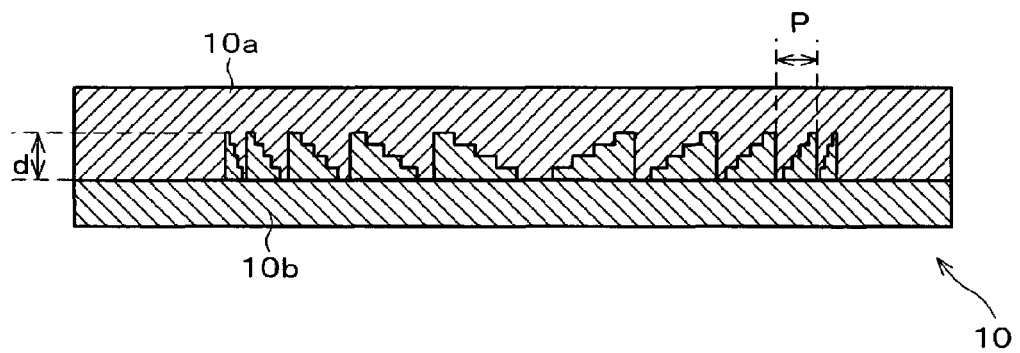

The present embodiment will describe by way of an example a built-in optical pickup in an optical disk recording/reproducing device which can handle both the next generation high density optical disk and the DVD. FIG. 1 is a schematic of the optical pickup of the present embodiment showing its arrangement. The optical pickup includes a semiconductor laser (first light source) 1a shining blue light (first light beam) at a short wavelength (wavelength λ1) of about 405 nm and a semiconductor laser (second light source) 1b shining red light (second light beam) at a long wavelength (wavelength λ2) of about 650 nm. The semiconductor lasers 1a, 1b are turned on switchably.

The present optical pickup includes: collimating lenses 2a, 2b which render the first and second light beams substantially parallel; footprint adjusting optical systems 3a, 3b which render an elliptical intensity distribution of a light flux substantially circular; and beam splitters 4a, 4b through which light beams are transmitted. A dichroic prism 5 merges the first and second light beams and aligns optical axes. The merged light is transmitted through common optical components in the order of a quarter-wave plate 7, a spherical aberration correction system 8, a mirror 9, a combination-type diffractive element 10, an objective lens (light collecting means) 11. The light then forms a small light spot on the information recording plane of one of the optical disks: the first recording medium 13a or the second recording medium 13b.

Besides the foregoing light shining optical system, the optical pickup further includes reproduction signal detecting optical systems 14a, 14b which may be one of various conventional, publicly known optical systems and reproduce a light spot control signal for automatic focusing, tracking, and other purposes and an information signal recorded on the optical disk.

The systems 3a, 3b which adjust the beam intensity distribution in the optical system has a function to render substantially circular an elliptical intensity distribution of a light flux shone by the semiconductor lasers 1a, 1b. The footprint adjusting optical systems 3a, 3b are arranged from a conventional, publicly known optical system: for example, a single triangle prism, a combination of triangle prisms, or two isolated triangle prisms.

The spherical aberration correction system 8 corrects a spherical aberration caused by, for example, irregularities in thickness of the optical disk 13a/13b. The spherical aberration correction system 8 is arranged from a conventional, publicly known optical system, such as a beam expander or a liquid crystal correction device. The footprint adjusting optical systems 3a, 3b and the spherical aberration correction system 8 are not essential in the present invention and can be omitted without affecting advantages of the invention.

Now, an operation will be described which records/reproduces information on the optical disk 13a having a substrate thickness of 0.1 mm (=t1) using a 405-nm semiconductor laser 1a. Referring to FIG. 1, the first light beam shone by the semiconductor laser 1a is rendered a substantially parallel light flux by the collimating lens 2a and transmitted through the footprint adjusting optical system 3a, the beam splitter 4a, the dichroic prism 5, the quarter-wave plate 7, the spherical aberration correction system 8, the mirror 9, and the combination-type diffractive element 10. The first light beam, transmitted through the combination-type diffractive element 10, is focused by the objective lens 11 on the optical disk 13a having a substrate thickness of 0.1 mm to form a light spot SPa. The combination-type diffractive element 10 and the objective lens 11 are mounted to an actuator (drive means) 12 so that tracking can be performed using the light spot SPa in the case of vibration of the plane of the optical disk 13a and decentering of the information track. The optical disk 13a is assumed to be a next generation high density optical disk in the present embodiment.

The combination-type diffractive element 10 is a combination of two materials which show different refractive index behaviors in relation to wavelength, and its combining plane where the two materials meet is sawtoothed or blazed like steps. The two materials are chosen so that their refractive indices are almost equal at around 405 nm (the function of the combination-type diffractive element 10 will be detailed later). Such choice of the materials, in effect, saves the wave front of the about 405-nm transmitted light from influence of the combination-type diffractive element 10. The numerical aperture of the objective lens 11 is set to 0.85 (=NA1) at about 405 nm.

The reflection off the optical disk 13a is transmitted through the objective lens 11, the combination-type diffractive element 10, the mirror 9, the spherical aberration correction system 8, the quarter-wave plate 7, and the dichroic prism 5, before being reflected by the beam splitter 4a and entering the reproduction signal detecting optical system 14a in which are reproduced a light spot control signal for automatic focusing, tracking, and other purposes and an information signal recorded on the optical disk 13a.

Next, an operation will be described which records/reproduces information on the optical disk 13b having a substrate thickness of 0.6 mm (=t2) using a 650-nm semiconductor laser 1b. Referring to FIG. 1, the second light beam shone by the semiconductor laser 1b is rendered a substantially parallel light flux by the collimating lens 2b and transmitted through the footprint adjusting optical system 3b and the beam splitter 4b. The second light beam is then reflected by the dichroic prism 5 so that the beam takes the same path as the 405-nm first light beam, traveling through the quarter-wave plate 7, the spherical aberration correction system 8, the mirror 9, and the combination-type diffractive element 10. The second light beam, transmitted through the combination-type diffractive element 10, is focused by the objective lens 11 on the optical disk 13b having a substrate thickness of 0.6 mm to form a light spot SPb. The combination-type diffractive element 10 and the objective lens 11 are mounted to the actuator 12 so that tracking can be performed using the light spot SPb in the case of vibration of the plane of the optical disk 13b and decentering of the information track. The optical disk 13b is assumed to be a DVD in the present embodiment.

The combination-type diffractive element 10 is, as described previously, a combination of two materials which show different refractive index behaviors in relation to wavelength, and its combining plane is blazed.

Generally, the spherical aberration, normalized with respect to wavelength, has a tolerance inversely proportional to wavelength. It is therefore more difficult to obtain desirable properties at 405-nm blue wavelength than at 650-nm red wavelength. Accordingly, an aspherical lens with spherical aberration corrected at the blue wavelength is used as the objective lens 11. The combination-type diffractive element 10 consequently corrects spherical aberration caused by a difference in substrate thickness for red light, but not for blue light. The present embodiment employs the objective lens 11 of which the spherical aberration is corrected for blue light, and uses blue, 0 order light for the next generation high density optical disk (optical disk 13a) and red, +1 order diffracted light for the DVD (optical disk 13b).

In other words, the objective lens 11 has its spherical aberration corrected at wavelengths around 405 nm (blue light). Therefore, the combination-type diffractive element 10 corrects the spherical aberration caused by a difference in substrate thickness for wavelengths around 650 nm (red light), but not for wavelengths around 405 nm. In addition, the two materials constituting the combination-type diffractive element 10 have different refractive index dispersions at red light wavelengths so as to produce different refractive indices. The combining plane geometry and the difference in refractive index between the two materials correct the spherical aberration which occurs when a flux of red light is focused on the optical disk 13b having a substrate thickness of 0.6 mm. Thus, good light convergence to the spot SPb is observed.

The reflection off the optical disk 13b is transmitted through the objective lens 11, the combination-type diffractive element 10, the mirror 9, the spherical aberration correction system 8, and the quarter-wave plate 7, before being separated by the dichroic prism 5 according to wavelength. The light is then transmitted through the mirror 6 and reflected by the beam splitter 4b, to enter the reproduction signal detecting optical system 14b. The reproduction signal detecting optical system 14b, like the reproduction signal detecting optical system 14a, reproduces a light spot control signal for automatic focusing, tracking, and other purposes and an information signal recorded on the optical disk 13b.

Figure 3:
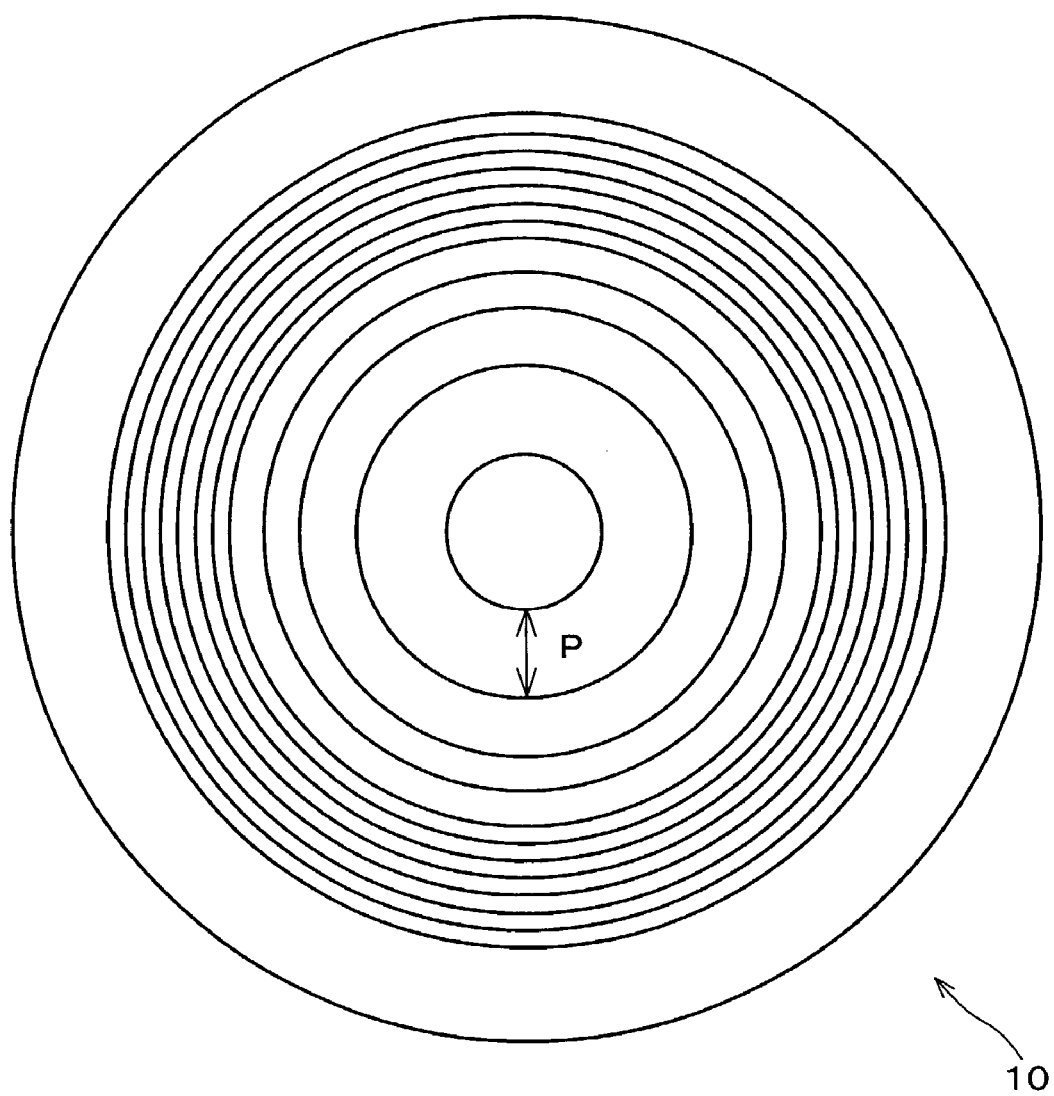
FIG. 3 is a plan view of a combination-type diffractive element for use in an optical pickup of the present embodiment as viewed in the direction of the optical axis.
Figure 4:
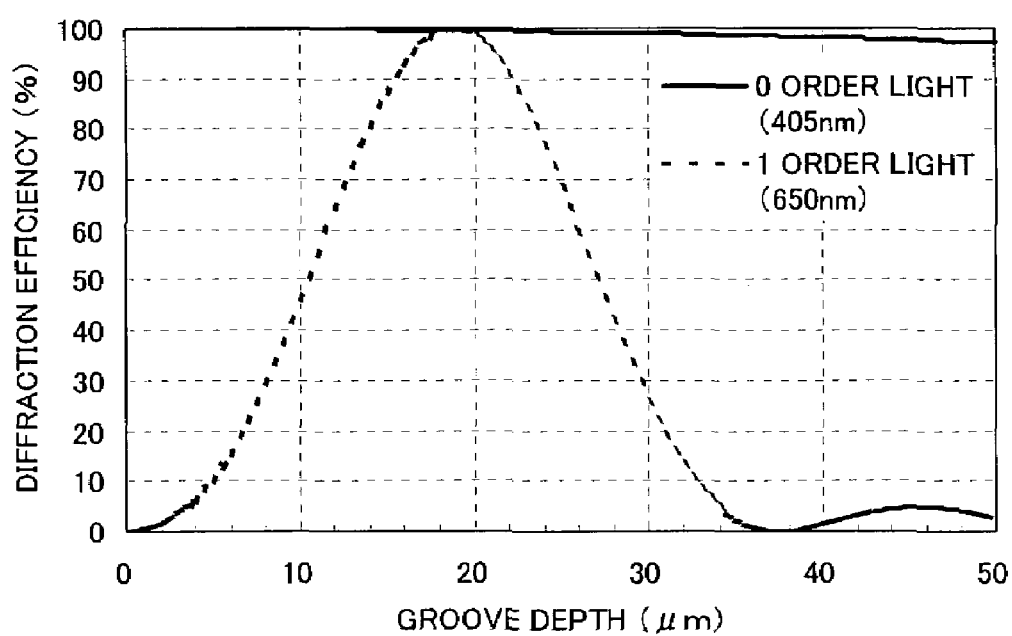
FIG. 4 is a graph showing results of calculation of changes in diffraction efficiency of a combination-type diffractive element for use in an optical pickup of the present embodiment.
Figure 5:
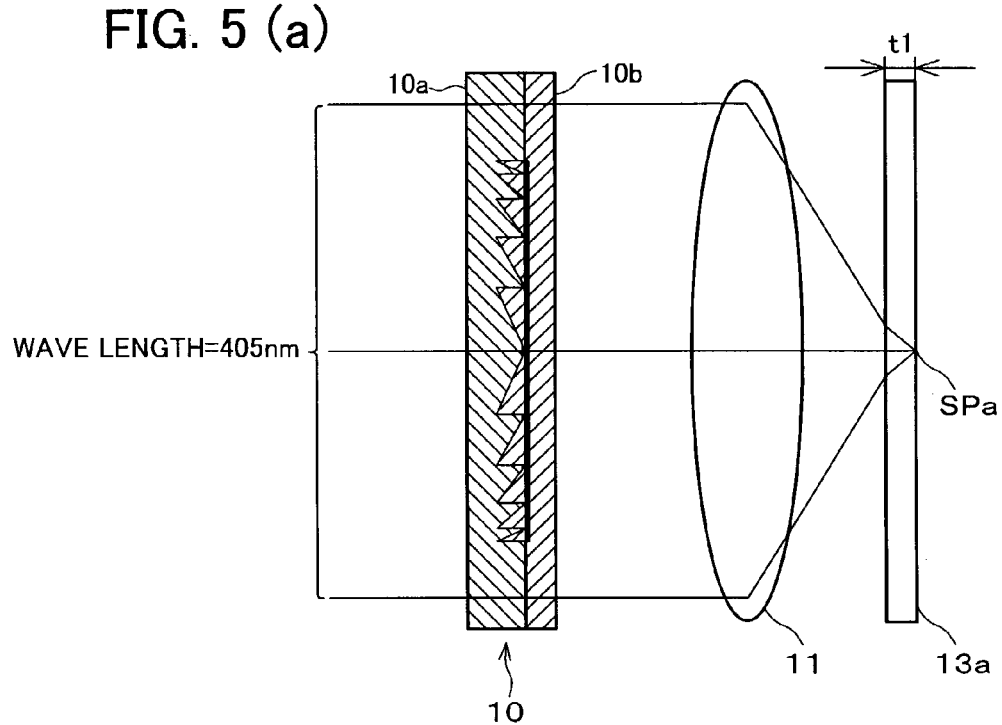
FIG. 5(a) is a schematic representation illustrating a function of a combination-type diffractive element for use in an optical pickup in recording/reproducing on an optical disk having a substrate thickness of t1 with a 405-nm wavelength light flux.
FIG. 5(b) is a schematic representation illustrating a function of a combination-type diffractive element for use in an optical pickup in recording/reproducing on an optical disk having a substrate thickness of t2 with a 650-nm wavelength light flux.
Figure 5:
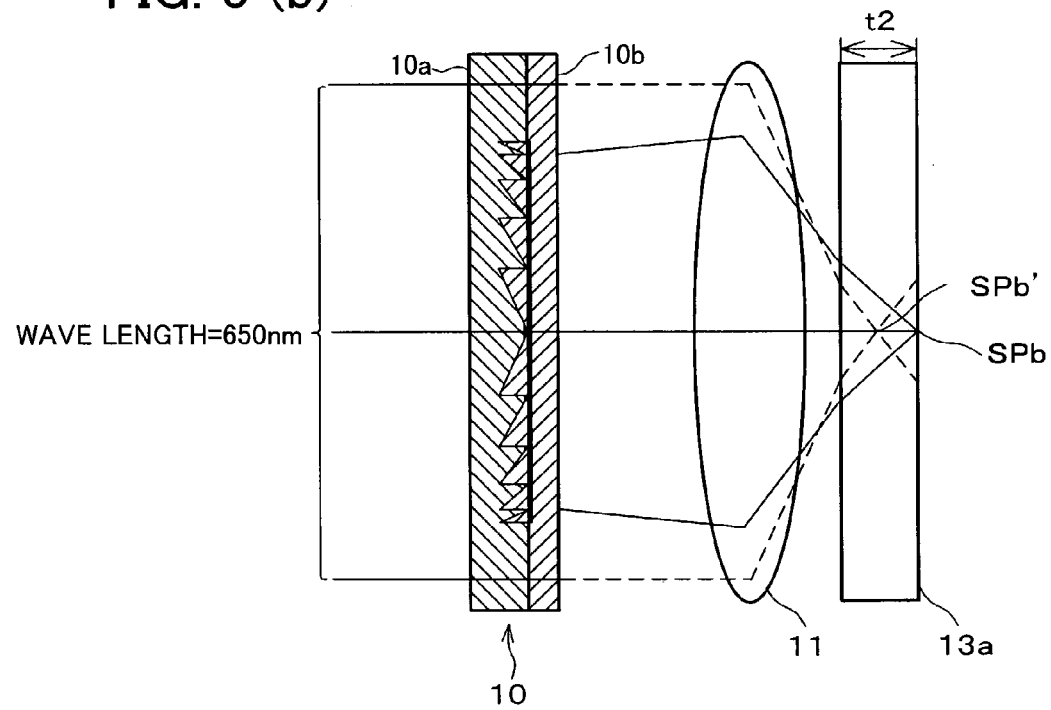
Figure 6:
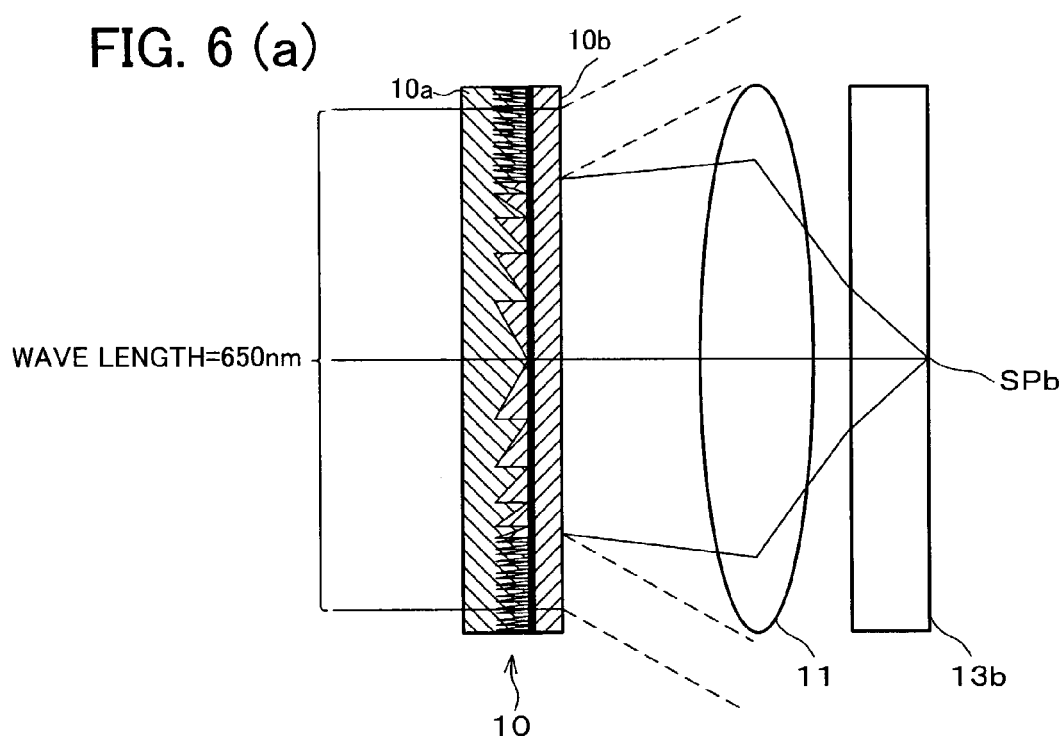
FIGS. 6(a), 6(b) are schematic representations illustrating functions of combination-type diffractive elements having different combining plane geometries.
Figure 6:
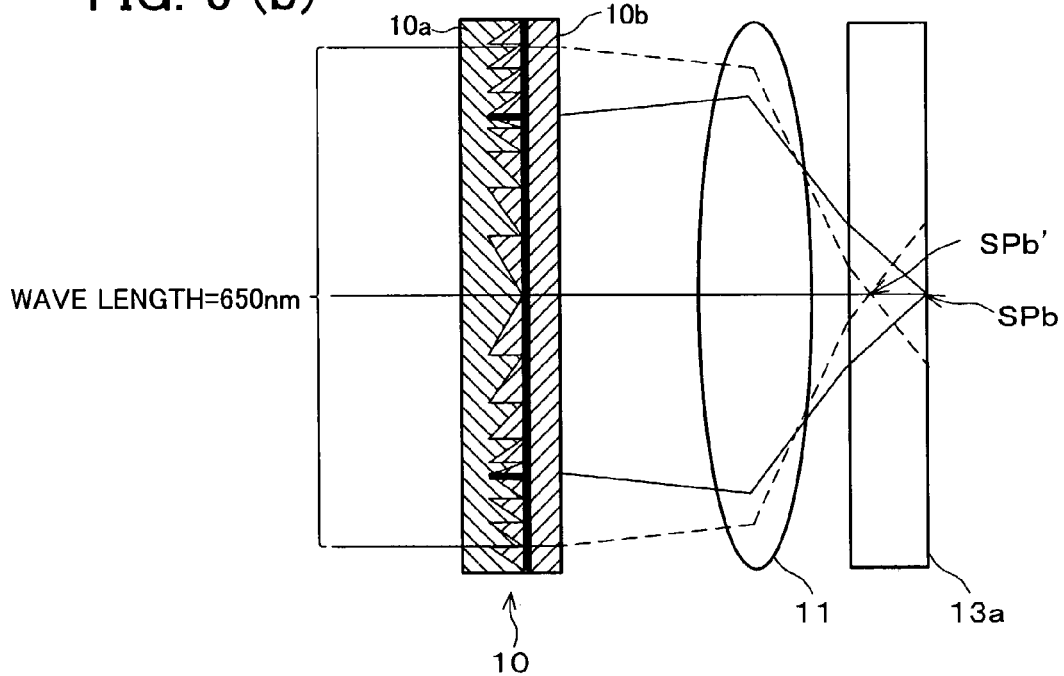

Now, the combination-type diffractive element 10 in the optical pickup will be described in more detail in reference to FIGS. 2(a), 2(b), and 3. FIG. 2(a), FIG. 2(b) show cross sections of the combination-type diffractive element as viewed in the direction of the optical axis, whereas FIG. 3 shows a plan view of the combination-type diffractive element 10 as viewed in the direction of the optical axis.

Referring to FIGS. 2(a), 2(b), the combination-type diffractive element 10 includes a light transmissive blazed substrate 10a having grooves (depth=d) on which is placed a substrate 10b. Referring to FIG. 3, the grooves are formed concentric on each substrate and provided on a part of the combining plane 10c (center), to impart a diffracting function to the combination-type diffractive element 10. The grooves on the combining plane 10c are either sawtoothed as in FIG. 2(a) or stepped as in FIG. 2(b). For example, a diffraction grating with a sawtoothed cross section (combination-type diffractive element 10) is advantageous for its high diffraction efficiency. The cross-sectional profile of the diffraction grating can be shaped by any suitable methods of which there are many for selection in view of particular needs: e.g., precision cutting using a diamond turning tool and application of a photo lithography technique. The diffraction grating thus comes to have a sawtooth or quasi-blazed, step-like profile. The blazed substrate 10a with grooves and the substrate 10b provided on top of it are combined together with no empty space at the combining plane 10c of the combination-type diffractive element 10.

The spacing from one peak to next in the sawtooth or step-like blaze profile is termed "pitch (p)." In the present embodiment, the pitch is specified to correct the spherical aberration caused by a difference in thickness between the optical transmissive layers of the optical disks 13a, 13b.

In the combination-type diffractive element 10, the depth d of the grooves on the combining plane is specified so as to maximize the diffraction efficiency for the 0 order diffraction of the first laser light (the first light beam) and the +1 order diffraction of the second laser light (the second light beam). Specifically, two glass materials, TPH55 and SYGH52 available from HOYA Corporation, are used as the substrates constituting the combination-type diffractive element 10, and the diffraction efficiency are calculated for the 0 order diffraction of the first laser light having a wavelength of 405 nm and the +1 order diffraction of the second laser light having a wavelength of 650 nm in the following manner:

Scalar theory is applicable to the combination-type diffractive element 10 in the present embodiment, because the device 10 has a pitch (p) which is large enough relatively to the wavelengths. Also, it can be treated as a "thin film grating," because its depth is more or less equal to the wavelengths. Accordingly, the diffraction efficiency, ηm (m is the diffraction order), is given by Equation (1):

$$\eta_m = \left| \frac{1}{T} \int_0^T A(x) \exp\{i\phi(x)\} \exp\left(-i\frac{2\pi mx}{T}\right) dx \right|^2 \quad (1)$$

where A(x) is a transmission amplitude distribution, Φ(x) is a phase distribution, p is the pitch on the combination-type diffractive element 10, and d is the depth of the groove of the combination-type diffractive element 10. In the calculation, A(x) is normalized: i.e., A(x)=1.

Properties of the glass materials (refractive indices of TPH55 and SYGH52) at the two wavelengths are shown in

TABLE 1

| Material | Refraction Index | |
|---|---|---|
| | 650 nm | 405 nm |
| TPH55 | 1.74755 | 1.81257 |
| SYGH52 | 1.78213 | 1.81331 |

Table 1 was prepared based on a glass material data sheets provided by HOYA Corporation. According to the table, the refractive indices of the two glass materials (TPH55 and SYGH52) are almost equal at 405 nm (not more than 0.004), but differs from each other by about 0.04 at 650 nm. Calculated values of the diffraction efficiency rim under these conditions are shown in a graph in FIG. 4: the horizontal axis represents the depth d of the diffraction grating (combination-type diffractive element 10) (see FIGS. 2(a), 2(b)), and the vertical axis represents the diffraction efficiency ηm which changes with the depth d; the solid line is 0 order light at 405 nm, and the broken line is +1 order light at 650 nm. It is understood from the FIG. 4 graph that the groove depth d should be set approximately between 15 μm and 22 μm to obtain a good diffraction efficiency of about 90% at both wavelengths.

Figure 9:
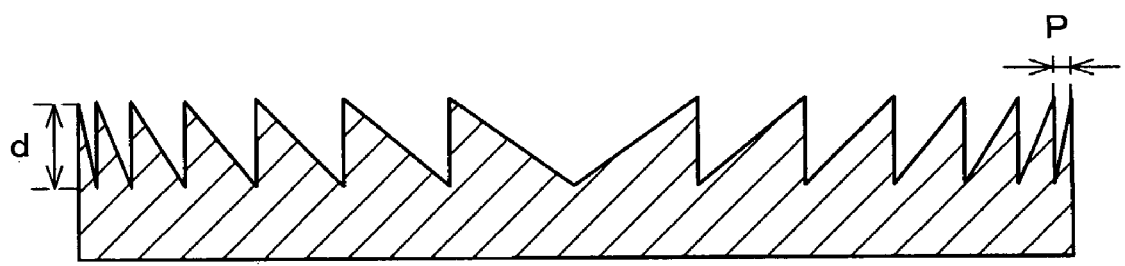
FIG. 9 is a cross section of a diffractive element used in a conventional optical pickup showing its profile as an example.
Figure 10:
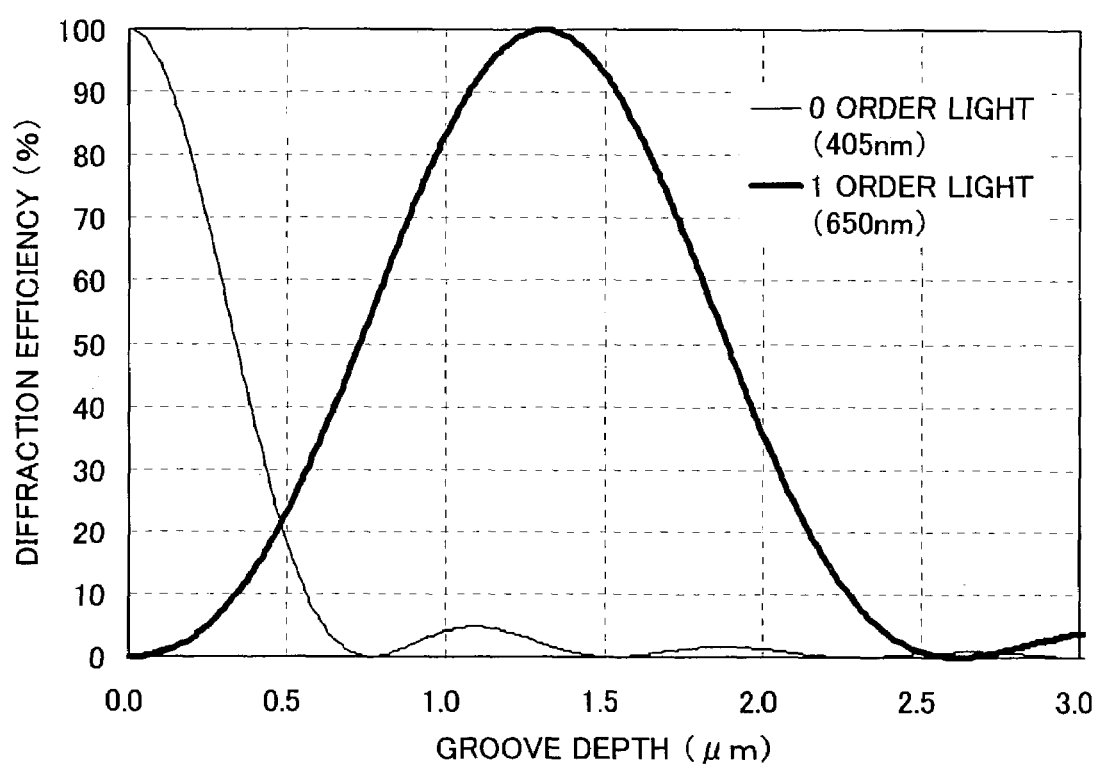
FIG. 10 is a graph showing results of calculation of changes in diffraction efficiency of a diffractive element for use in a conventional optical pickup.

A comparative example is given in FIG. 10 in which are shown calculated values of the diffraction efficiency of the diffractive element of the second conventional example. FIG. 9 illustrates the cross-sectional profile of that diffractive element, where p is the pitch on the diffractive element, and d is the groove depth of the diffractive element. In the comparative example, p is varied in the range of 160 μm to 260 μm, and d is varied in the range of 0 μm to 3 μm. The diffractive element is primarily made of, for example, a plastic "OZ-1000" (available from Hitachi Chemical Co., Ltd.). In FIG. 10, the horizontal axis represents the depth d on the diffractive element, and the vertical axis represents the diffraction efficiency of the diffractive element; and the thin solid line is 0 order light at 405 nm, and the thick solid line is +1 order light at 650 nm.

It is understood from FIG. 10 that the groove depth of the blazed diffractive element of the second conventional example needs to be 0.2 μm or less to achieve an 80% diffraction efficiency with the 0 order light at the blue wavelength, but at that depth, the efficiency of the 1 order light at the red wavelength is well below 10%. Therefore, the second conventional example, if applied to address the compatibility issue between the next generation high density optical disk and the DVD, yields a low utilization efficiency at the red wavelength of 650 nm.

As demonstrated in the foregoing, the combination-type diffractive element 10 for use in an optical pickup in accordance with the present invention achieves better diffraction efficiency than conventional diffractive elements and allows the groove depth d to be set to a readily fabricable value. The present embodiment has so far assumed that the combination-type diffractive element 10 be a combination of unlike glass materials, but is not limited to this. Alternatively, resin material may be used so long as it produces similar effects. An example of using a resin material is to pour a UV-cured resin on a blazed diffractive element (substrate 10a) and cure the resin by UV radiation, to provide a substrate 10b. This method can combine the substrates 10a, 10b so as to leave no empty space between the blazed substrate 10a having grooves and the substrate 10b fabricated thereon.

Next, the combine diffractive element 10 will be described in terms of its functions in reference to FIGS. 5(a), 5(b). FIG. 5(a) illustrates information being recorded/reproduced on the optical disk 13a having a substrate thickness of 0.1 mm (=t1) using a light flux at 405 nm, while FIG. 5(b) illustrates information being recorded/reproduced on the optical disk 13b having a substrate thickness of 0.6 mm (=t2) using a light flux at 650 nm.

Referring to FIG. 5(a), the light flux at 405 nm is transmitted through the combination-type diffractive element 10 and collected by the objective lens 11 to form a light spot SPa on the optical disk 13a. The combination-type diffractive element 10 is fabricated by combining two materials which show different refractive index behaviors in relation to wavelength. The two materials are chosen so that their refractive indices n1, n2 are almost equal at about 405 nm. Therefore, the combination-type diffractive element 10 transmits, without affecting, the substantially parallel, 405-nm incident light flux; the output flux remains substantially parallel and is of 0 order. Since the objective lens 11 is designed optimally to a wavelength of 405 nm and a substrate thickness of 0.1 mm, the light flux hitting the objective lens 11 with a numerical aperture of 0.85 forms the spot SPa with such good light convergence as intended in design.

In contrast, to record/reproduce information on the optical disk 13b having a substrate thickness of 0.6 mm, a light beam at 650 nm is shone as shown in FIG. 5(b). The two materials constituting the combination-type diffractive element 10 are chosen so that their refractive indices n1, n2 show different behaviors in relation to wavelength at around 650 nm. A phase difference is created at the blazed surface; the substantially parallel, 650-nm incident light flux is diffracted by the combination-type diffractive element 10. The groove depth d on the combination-type diffractive element 10 is preferably specified so that it is optimal to the difference between the refractive indices n1, n2. Such specification enables the combination-type diffractive element 10 to diffract almost the whole incident light flux as +1 order diffracted light. Further, the groove pitch is set to a predetermined width to cancel the spherical aberration caused by variations in substrate thickness of the optical disk. The design enables the objective lens 11 designed optimally to a wavelength of 405 nm and a substrate thickness of 0.1 mm to form the light spot SPb on the optical disk 13b having a substrate thickness of 0.6 mm with good light convergence.

Incidentally, as shown in FIG. 5(b), the objective lens 11 is specified so that if a 650-nm laser impinges on the combination-type diffractive element 10, only such a light flux which corresponds to the numerical aperture of 0.6 (NA2) in the +1 order diffracted light enters the entrance pupil of the objective lens 11. The combination-type diffractive element 10 is either sawtoothed or blazed like steps so that the peripheral light which does not correspond to the numerical aperture of 0.6 enters the objective lens 11 as 0 order light. In other words, to readily separate light so that only the light flux which corresponds to the numerical aperture of 0.6 enters the entrance pupil of the objective lens 11, the combination-type diffractive element 10 only needs to be partly blazed where a light flux corresponding to the numerical aperture of 0.6 passes.

As in the foregoing, the optical pickup is arranged so that the combination-type diffractive element 10 allows only the portion of the 650-nm laser light flux which corresponds to the numerical aperture of 0.6 to enter the entrance pupil of the objective lens 11 as +1 order diffracted light. The arrangement achieves good light convergence to the light spot SPb at which the portion of the light flux which corresponds to the numerical aperture of 0.6 is focused, by the objective lens 11 collecting the +1 order diffracted light on the optical disk 13b having a substrate thickness of 0.6 mm.

The peripheral light which does not correspond to the numerical aperture of 0.6 converges to SPb' in front, not on the optical disk 13b having a substrate thickness of 0.6 mm, as indicated in a dashed line in FIG. 5(b). The peripheral light is sufficiently spread on the recording plane of the optical disk 13b and in practice has no effect in recording/reproduction. The combination-type diffractive element 10 can be made in practice to function as an equivalent to an aperture limiting filter. In other words, the use of such a combination-type diffractive element 10 eliminates the need for an aperture limiting filter and still is capable of switching between the numerical apertures of the objective lens 11. This is however by no means limiting the present invention; an aperture limiting filter may be used to ensure switching between the numerical apertures of the objective lens.

To better ensure switching between the numerical apertures of the objective lens 11, such a combination-type diffractive element 10 as shown in FIG. 6(a) may be used. The combination-type diffractive element 10 in FIG. 6(a) is blazed at a narrower pitch in a part which corresponds to outside the numerical aperture range of 0.6 than a part which corresponds to the numerical aperture range of 0.6. Blazed in this way, the combination-type diffractive element 10 is capable of diffracting 650-nm laser light so that a portion of +1 order diffracted light which corresponds to outside the numerical aperture range of 0.6 diverges and does not enter the objective lens 11. Put differently, only a portion of +1 order, 650-nm diffracted light which corresponds to the numerical aperture of 0.6 enters the entrance pupil of the objective lens 11, and the peripheral portion is diffracted beyond the entrance pupil of the objective lens 11. The use of such a combination-type diffractive element 10 eliminates the need for an aperture limiting filter and still is capable of ensuring switching between the numerical apertures of the objective lens 11.

Another example of the combination-type diffractive element may have a combining plane geometry shown in FIG. 6(b). The combination-type diffractive element 10 shown in FIG. 6(b) is blazed in a part which corresponds to outside the numerical aperture range of 0.6 in an opposite direction to the direction in which it is blazed in a part which corresponds to the numerical aperture range of 0.6. The combination-type diffractive element 10 blaze in this manner is capable of diffracting incoming light so that a portion of +1 order, 650-nm diffracted light which corresponds to outside the numerical aperture range of 0.6 is converged. The use of such a combination-type diffractive element 10 converges the light outside the light flux corresponding to the numerical aperture of 0.6 to SPb" in front, not on the optical disk 13b having a substrate thickness of 0.6 mm, as indicated in a dashed line in FIG. 6(b). Because SPb" is located further in front of the light-collecting spot SPb' in FIG. 5(b), the light is spread wider on the recording plane of the optical disk 13b and does not affect recording/reproduction. The blaze profile of the combination-type diffractive element 10 shown in FIG. 6(b) is more readily fabricable than that of the combination-type diffractive element 10 shown in FIG. 6(a) for its wider pitch.

In the foregoing, combination-type diffractive elements having the grating shapes in FIGS. 6(a), 6(b) have been taken as examples of the combination-type diffractive element having a grating shape which produces +1 order diffracted light such that a portion of a 650-nm light flux which corresponds to the numerical aperture 0.6 and a portion which corresponds to outside that range are converged to different points. However, the combination-type diffractive element 10 is not limited in any particular manner in terms of the grating shape outside the portion of the 650-nm light flux which corresponds to the numerical aperture of 0.6, provided that the lens collects portions of +1 order diffracted light from that part of the grating and from outside the part at different points.

The combination-type diffractive element 10 of the present embodiment may be positioned anywhere between the semiconductor laser 1b and the objective lens 11, because the device does not affect the 405-nm blue light and functions as a correction lens only for the 650-nm red light. In the present embodiment, the combination-type diffractive element 10 and the objective lens 11 are driven as a single unit to prevent light convergence degradation due to a displacement of the optical axis of the objective lens 11 in movement.

Figure 7:
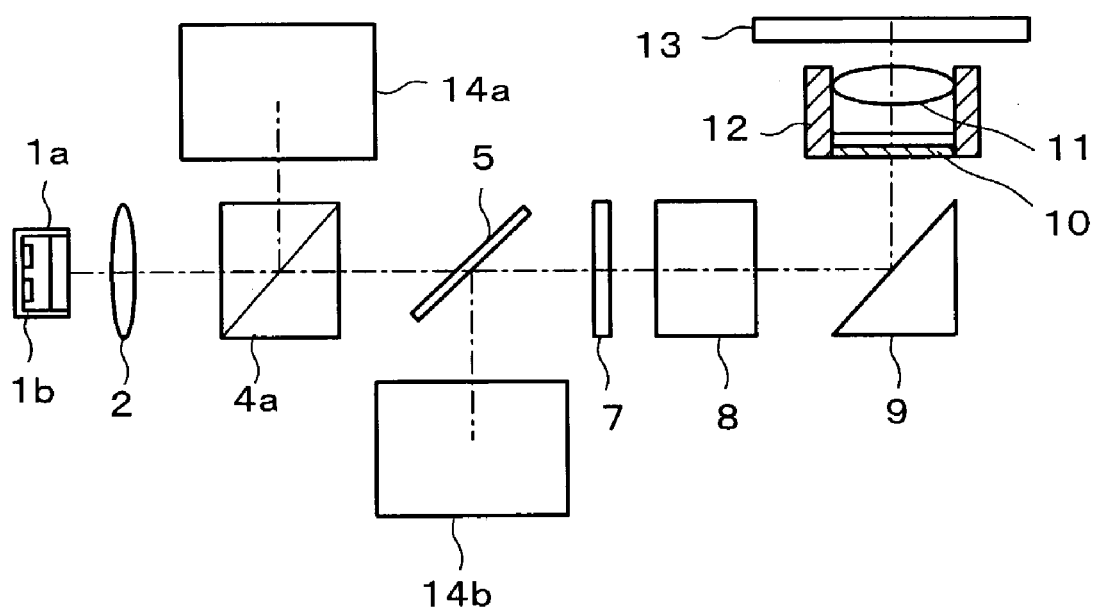
FIG. 7 is a schematic representation of the arrangement of an optical pickup of another embodiment in accordance with the present invention.
Figure 8:
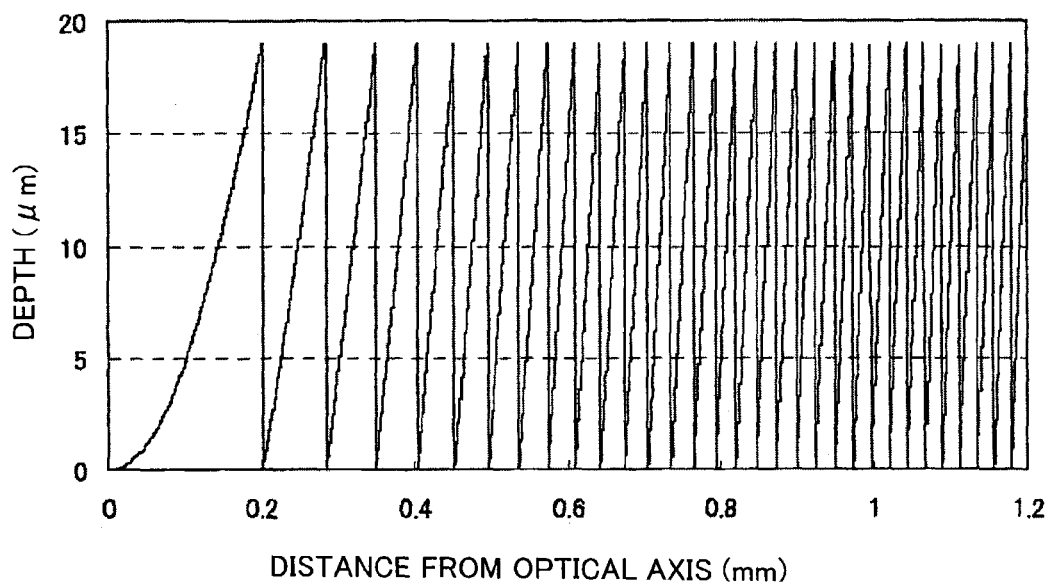
FIG. 8(a) is a graph depicting the combining plane geometry of a combination-type diffractive element of the present example, and FIG. 8(b), which is an enlargement of FIG. 8(a), is a graph depicting a part of the combining plane geometry where the pitch is minimum.
Figure 8:
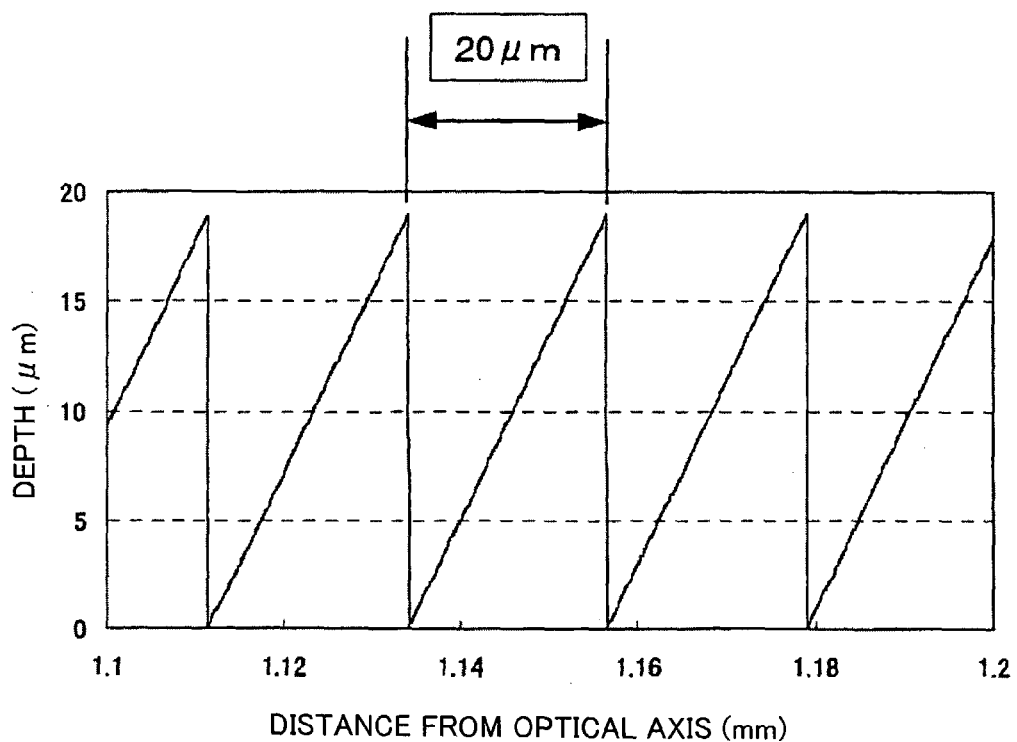

An optical pickup is shown in FIG. 7 as another embodiment in accordance with the present invention. The optical pickup in the figure includes a module in which a semiconductor laser 1a for blue light and a semiconductor laser 1b for red light are integrated. Adopting this structure allows for production of compact optical pickups. Further size reduction becomes possible using a conventional, publicly known diffractive element, if a module structure is adopted in which the semiconductor lasers 1a, 1b are integrated with the signal detecting optical systems 13a, 13b.

The instant embodiment discusses the invention, taking as examples optical pickups which can be used both for the next generation high density optical disk (substrate thickness=0.1 mm, blue light) and the DVD (substrate thickness=0.6 mm, red light). However, the optical pickup in accordance with the present invention is not limited by the aforementioned substrate thickness or wavelength, and is applicable to any pair of optical disks with different substrate thicknesses.

The next generation high density optical disk uses light having a wavelength of 405 nm±10 nm for recording/reproduction. The DVD uses light having a wavelength of 650 nm±20 nm for recording/reproduction.

EXAMPLE

The following will describe examples in accordance with the present invention.

In the present example, wavefront aberration was specifically calculated for the next generation high density optical disk (wavelength=405 nm, substrate thickness=0.1 mm) and the DVD (wavelength 650=nm, substrate thickness=0.6 mm). Results are shown below. The wavefront aberration calculation was based on a combination-type diffractive element 10 using two types of glass, TPH55 and SYGH52, and objective lenses configured as in Tables 2, 3. Table 2 shows a lens configuration for the next generation high density optical disk, whereas Table 3 shows the lens arrangement for the DVD.

TABLE 2

Next Generation High Density Optical Disk

|  | Surface No. | Curvature Radius | Surface Distance | Material |
|---|---|---|---|---|
| Combination-Type Diffractive Element | 1 | Infinity | 0.20 | *1 |
|  | 2 | Infinity | 0.20 | *2 |
|  | 3 | Infinity | 0.05 |  |
| Objective Lens | 5 | 1.41 | 2.40 | *3 |
|  | 6 | 16.37 | 0.10 |  |
| Optical Disk | 7 | Infinity | 0.10 | Polycarbonate |
|  | 8 | Infinity | 0.252482 |  |

*1: TPH55_OHARA
*2: SYGH52_OHARA
*3: LAH67_OHARA

TABLE 3

DVD

|  | Surface No. | Curvature Radius | Surface Distance | Material |
|---|---|---|---|---|
| Combination-Type Diffractive Element | 1 | Infinity | 0.20 | *1 |
|  | 2 | Infinity | 0.20 | *2 |
|  | 3 | Infinity | 0.05 |  |
| Objective Lens | 5 | 1.41 | 2.40 | *3 |
|  | 6 | 16.37 | 0.10 |  |
| Optical Disk | 7 | Infinity | 0.60 | Polycarbonate |
|  | 8 | Infinity | 0.0999382 |  |

*1: TPH55_OHARA
*2: SYGH52_OHARA
*3: LAF21_SCHOTT

In Tables 2, 3, the first surface (surface No. 1) and the third surface (surface No. 3) refer to the entrance and exit surfaces of the combination-type diffractive element 10. The second surface (surface No. 2) refers to the blazed combining plane of the combination-type diffractive element 10. The fourth surface (surface No. 4) and the fifth surface (surface No. 5) are surfaces of the objective lens. The sixth surface (surface No. 6) and the seventh surface (surface No. 7) are surfaces of the optical disk.

The phase function $\Phi(r)$ and the aspherical surface Z under these conditions are given by Equations (2), (3).

$$\Phi(r) = m\frac{2\pi}{\lambda}(DF1r^2 + DF2r^4 + DF3r^6 + DF4r^8 + DF5r^{10}) \quad (2)$$

where m is the diffraction order, $\lambda$ is the wavelength, r is the radius from the optical axis, and DF1 to DF5 are coefficients.

$$Z = \frac{(1/R)r^2}{1 + \sqrt{1 - (1/R)^2(1+K)r^2}} Ar^2 + Br^4 + Cr^6 + Dr^8 + Er^{10} \quad (3)$$

where Z is the SAG amount, R is the curvature radius, K is the conical coefficient, r is the radius from the optical axis, and A to E are the aspherical coefficients.

Values were calculated for an aspherical lens based on Equations (2), (3). An aspherical lens having the values shown in Table 2 through Table 5 was automatically designed.

TABLE 4

|  |  | Surface No. 5 | Surface No. 6 |
|---|---|---|---|
| Conical Coefficient (K) |  | −6.69E−01 | −1.01E+01 |
| Aspherical | A | 1.38E−02 | 4.95E−01 |
| Coefficient | B | 4.04E−03 | −9.12E−01 |
|  | C | 3.55E−04 | 5.38E−01 |
|  | D | 2.98E−04 | −7.94E02 |
|  | E | 9.33E−05 | 4.95E−01 |

TABLE 5

|  | Surface No. 2 |
|---|---|
| DF1 | 1.96E−02 |
| DF2 | −3.89E−04 |
| DF3 | −1.99E−04 |
| DF4 | 0.00E+00 |
| DF5 | 0.00E+00 |

The objective lens in Table 2 is optimally designed to blue light and a substrate thickness of 0.1 mm.

Using the objective lens 11 in Table 2 alone with no combination-type diffractive element 10 being inserted, the RMS wavefront aberration was 0.002λ for blue light and a substrate thickness of 0.1 mm. The value, 0.002λ, of the spherical aberration was so small that the presence of the spherical aberration allowed sufficient information signal read-out from the optical disk 13a.

However, using the objective lens 11 in Table 3 alone with no combination-type diffractive element 10 being inserted, the RMS wavefront aberration was 0.5λ for red light and a substrate thickness of 0.6 mm. The value, 0.5λ, of the spherical aberration was so large that the presence of the spherical aberration was prohibitive to information signal read-out from the optical disk 13b.

With the combination-type diffractive element 10 being inserted, the RMS wavefront aberration was 0.002λ for blue light and a substrate thickness of 0.1 mm. The aberration value was so small as in the case of no combination-type diffractive element 10 being inserted, that the presence of the spherical aberration allowed sufficient readout from the optical disk 13a. For red light and a substrate thickness of 0.6 mm, spherical aberration was corrected, and the RMS wavefront aberration was so small as 0.002λ that its presence allowed sufficient information signal readout from the optical disk 13b.

The combining plane geometry of the combination-type diffractive element 10 here is shown in FIG. 8(a) where the horizontal axis represents the distance in millimeters from the optical axis of the laser light emitted by the semiconductor laser, and the vertical axis represents the groove depth d in micrometers. FIG. 8(b) is a graph showing the geometry of a part of the combining plane in which the pitch (p) is minimum. According to FIG. 8(b), the minimum pitch (p) and depth d of the combination-type diffractive element 10 were 20 μm and 19 μm respectively.

As in the foregoing, the optical pickup in accordance with the present invention is characterized in that between the first and second light sources and the light collecting means is there provided a combination-type diffractive element fabricated by combining two different raw materials at a combining plane which is shaped as a diffraction grating.

Since the combination-type diffractive element is fabricated from raw materials selected so that the materials have nearly equal refractive indices at one of the wavelengths, the configuration improves utilization efficiency of the light at the wavelength. The light at the other wavelength achieves good recording/reproduction with a recording medium, because the grating is shaped so as to form a light-collecting spot on the information recording plane of the recording medium. The structure enables a good light-collecting spot to be formed both on the first and second recording media for which light is used in recording/reproduction at two wavelengths which differ vastly from each other, irrespective of the wavelengths or substrate thicknesses of the recording media.

The optical pickup may be arranged so that if the first wavelength λ1 is smaller than the second wavelength λ2, NA1>NA2, where NA1 is a numerical aperture of the light collecting means receiving the light at the first wavelength λ1, and NA2 is a numerical aperture of the light collecting means receiving the light at the second wavelength λ2.

According to the arrangement, a fine light-collecting spot is formed on the information recording plane of the first recording medium using the light at the first wavelength λ1. Recorded/reproduction therefore becomes possible on recording media with higher recording density.

The optical pickup may be arranged so that if NA1>NA2, t1<t2, where t1 is the substrate thickness of the first recording medium, and t2 is the substrate thickness of the second recording medium.

Increasing the numerical aperture of the light collecting means leads to increases in an aberration when the recording medium is tilted. This in turn degrades convergence to the light-collecting spot. The aberration is proportional to the substrate thickness of the recording medium. Accordingly, even with an increased NA1, reducing the substrate thickness t2 of the first recording medium keeps at small values the aberration caused by the tilt of the recording medium, provided that the numerical aperture NA1 is greater than NA2.

The optical pickup is preferably such that if the first wavelength λ1 is smaller than the second wavelength λ2, the light collecting means has an aberration corrected for the light at the first wavelength λ1, and the two raw materials for the combination-type diffractive element have refractive indices which differ from each other by not more than 0.004 for the first wavelength λ1.

The light collecting means being used has an aberration corrected beforehand for the light at the first, shorter wavelength λ1 at which the aberration is difficult to correct with the diffractive element. To eliminate adverse effects from the combination-type diffractive element, it is preferred if the refractive indices of the two raw materials for the combination-type diffractive element are equal at the first wavelength λ1. It is however difficult to select such raw materials. Accordingly, the refractive index difference is set to or below 0.004; the light at the wavelength λ1 thereby is not affected, i.e., remains substantially parallel, as it passes through the combination-type diffractive element and exits the light collecting means as 0 order light. Consequently, according to the arrangement, the utilization efficiency of the light at the first wavelength λ1 can be made nearly 100%, and a light-collecting spot can be formed on the information recording plane of the first recording medium with good light convergence.

Besides, in this case, it is preferred if the refractive index difference of the two raw materials for the combination-type diffractive element is not less than 0.02 at the second wavelength λ2. Thus, the difference in substrate thickness between the first recording medium and the second recording medium sufficiently corrects the aberration which occurs to the light at the second wavelength λ2.

The optical pickup is preferably such that the first wavelength λ1 is smaller than the second wavelength λ2, the light collecting means has an aberration corrected for the light at the first wavelength λ1, and the combination-type diffractive element has a pitch so specified as to correct an aberration caused by a difference in substrate thickness between the first and second recording media in recording/reproducing information on the second recording medium.

The optical pickup is preferably such that if the first wavelength λ1 is smaller than the second wavelength λ2, the grating of the combination-type diffractive element is blazed for the light at the second wavelength λ2.

Here, the "blazed" grating refers to the grating which is shaped so that the diffraction angle at a particular wavelength and of particular diffraction order is equal to the refraction angle for the diffraction grating on the combining plane. Specifically, the "blazed grating for the light at the second wavelength λ2" refers to the grating which is shaped so that the diffraction angle of 1 order diffracted light for the light at the second wavelength λ2 is equal to a refraction angle for the diffraction grating on the combining plane.

According to the arrangement, the grating of the combination-type diffractive element is blazed for the second wavelength λ. As to the light at the wavelength λ2, diffraction efficiency is improved if the light-collecting spot is formed using 1 order diffracted light obtained from the combination-type diffractive element. Besides, the light utilization efficiency (diffraction efficiency) can be improved up to nearly 100% for recording/reproduction of both the first and the second recording media, if the light collecting means also has the aberration corrected for the first wavelength λ1.

The optical pickup may be such that the grating of the combination-type diffractive element is shaped so as to have a sawtooth cross-section.

According to the arrangement, the diffraction efficiency of the combination-type diffractive element is improved; high intensity light can be shone on the recording medium even at reduced power consumption. A good optical pickup is provided. If the grating is so sawtoothed or blazed like steps as to correct the spherical aberration caused by the difference in substrate thickness between the first and the second recording media, the distortion is surely corrected which occurs on the light wavefront due to the spherical aberration.

The optical pickup may be such that the grating of the combination-type diffractive element is shaped so as to have a step-like cross-section.

According to the arrangement, although the diffraction efficiency drops when compared to the grating with a sawtooth cross-section, the grating can be shaped more easily.

"Light corresponding to the numerical aperture NA2" refers to such a light flux that the entire system is narrowed down to produce the aperture NA2. The "area corresponding to NA2" refers to the area through which that light flux passes.

The combination-type diffractive element may be such that the combining plane is shaped as a grating only in a part where the combining plane receives a light flux corresponding to the numerical aperture NA2.

According to the arrangement, when the light at the second wavelength λ2 is shone, the light flux hitting the part corresponding to the numerical aperture NA2 forms a light-collecting spot on the information recording plane of the second recording medium. Besides, the light hitting outside the part corresponding to the numerical aperture NA2 is sufficiently diffused and not collected on the information recording plane, thereby no affecting recording/reproduction. This eliminates the need to use, for example, a aperture limiting filter to change the numerical aperture, thereby reducing the number of components in the optical pickup and contributing to size and weight reduction of the device.

The combination-type diffractive element may be shaped as a grating which produces 1 order diffracted light such that a portion of a light flux which corresponds to the numerical aperture NA2 corresponding to a light flux at the wavelength λ2 and a remaining portion of the light flux are converged to different points.

According to the arrangement, the numerical aperture of the light collecting means is surely switched according to variation in wavelength, without using, for example, an aperture limiting filter. This reduce the number of components in the optical pickup and contributes to size and weight reduction of the device.

The combination-type diffractive element and the light collecting means may be mounted to the same drive means.

According to the arrangement, the combination-type diffractive element and the light collecting means are moved as a single body. Good tracking can be performed using the light-collecting spot in the case of vibration of the plane of the recording medium and decentering of the information track of the recording medium.

The optical pickup is preferably such that the first wavelength λ1 is smaller than the second wavelength λ2, and the combining plane of the combination-type diffractive element as a diffraction grating has a depth so specified that diffraction efficiencies are maximum for 0 order diffraction for the light at the first wavelength λ1 and +1 order diffraction for the light at the second wavelength λ2.

According to the arrangement, an optical pickup is provided which is compatible both with the two recording media with different substrate thicknesses, which boasts high diffraction efficiency i.e., high utilization efficiency, of the diffracted, incident light at the two wavelengths on the information recording planes of the recording media, and records/erases information which requires high intensity light. Further, according to the arrangement, the light output can be reduced, and the power consumption by the light source can be kept low.

The raw materials for the combination-type diffractive element may be glasses.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed:

1. An optical pickup for forming a light-collecting spot on an information recording plane to optically record/reproduce information, said pickup comprising:

a first light source for emitting light at a first wavelength λ1;

a second light source for emitting light at a different, second wavelength λ2 from the first wavelength λ1, such that λ1<λ2;

light collecting means for forming a light-collecting spot on an information recording plane of a first recording medium from the light at the wavelength λ1 and forming a light-collecting spot on an information recording plane of a second recording medium from the light at the wavelength λ2, the first and second recording media having different substrate thicknesses; and a diffractive element disposed between the first and second light sources and the light collecting means, wherein the diffractive element is of a combination type fabricated by combining two different raw materials at a combining plane which is shaped as a diffraction grating, and the light collecting means has an aberration corrected for the light at the first wavelength λ1.

2. The optical pickup as set forth in claim 1, wherein the two raw materials exhibit different refractive index behaviors in relation to wavelength.

3. The optical pickup as set forth in claim 2, wherein t1<t2, where t1 is the substrate thickness of the first recording medium, and t2 is the substrate thickness of the second recording medium.

4. The optical pickup as set forth in claim 3, wherein the combination-type diffractive element has a pitch so specified as to correct an aberration caused by a difference in substrate thickness between the first and second recording media in recording/reproducing information on the second recording medium.

5. The optical pickup as set forth in claim 1, wherein:
the first wavelength λ1 is smaller than the second wavelength λ2; and
NA1>NA2, where NA1 is a numerical aperture of the light collecting means receiving the light at the first wavelength λ1, and NA2 is a numerical aperture of the light collecting means receiving the light at the second wavelength λ2.

6. The optical pickup as set forth in claim 5, wherein the combining plane is shaped as a diffraction grating only in a part where the combining plane receives a light flux correspond to the numerical aperture NA2.

7. The optical pickup as set forth in claim 5, wherein the combining plane is shaped as a diffraction grating which produces 1 order diffracted light such that a portion of a light flux which corresponds to the numerical aperture NA2 corresponding to a light flux at the wavelength λ2 and a remaining portion of the light flux are converged to different points.

8. The optical pickup as set forth in claim 1, wherein:
the two raw materials have refractive indices which differ from each other by not more than 0.004 for the first wavelength λ1.

9. The optical pickup as set forth in claim 8, wherein the refractive indices differ from each other by not less than 0.02 at the second wavelength λ2.

10. The optical pickup as set forth in claim 1, wherein:
the combining plane as a diffraction grating is shaped so that a diffraction angle of 1 order diffracted light for the light at the second wavelength λ2 is equal to a refraction angle in the diffraction grating on the combining plane.

11. The optical pickup as set forth in claim 1, wherein:
the combining plane as a diffraction grating has a depth so specified that diffraction efficiencies are maximum for 0 order diffraction for the light at the first wavelength λ1 and +1 order diffraction for the light at the second wavelength λ2.

12. The optical pickup as set forth in claim 1, wherein the combining plane as a diffraction grating is shaped so as to have a sawtooth cross section.

13. The optical pickup as set forth in claim 1, wherein the combining plane as a diffraction grating is shaped so as to have a step-like cross section.

14. The optical pickup as set forth in claim 1, wherein the combination-type diffractive element and the light collecting means are mounted to the same drive means.

15. The optical pickup as set forth in claim 1, wherein the raw materials are glasses.

16. An optical pickup for forming a light-collecting spot on an information recording plane to optically record/reproduce information, said pickup comprising:
a first light source for emitting light at a first wavelength λ1;
a second light source for emitting light at a different, second wavelength λ2 from the first wavelength λ1;
light collecting means for forming a light-collecting spot on an information recording plane of a first recording medium from the light at the wavelength λ1 and forming a light-collecting spot on an information recording plane of a second recording medium from the light at the wavelength λ2, the first and second recording media having different substrate thicknesses; and
a diffractive element disposed between the first and second light sources and the light collecting means,
wherein
the diffractive element is of a combination type fabricated by combining two different raw materials at a combining plane which is shaped as a diffraction grating, and
the wavelength λ1 is 405 nm±10 nm, and the wavelength λ2 is 650 nm±20 nm.

17. An optical pickup, comprising:
a first light source for emitting light at a first wavelength λ1;
a second light source for emitting light at a different, second wavelength λ2 from the wavelength λ1, such that λ1<λ2;
a light collecting device for forming a light-collecting spot on an information recording plane of a first recording medium from the light at the wavelength λ1 to record/reproduce information thereon, and for forming a light-collecting spot on an information recording plane of a second recording medium from the light at the wavelength λ2 to record/reproduce information thereon, the first and second recording media having different substrate thicknesses; and
a diffractive element disposed between the first and second light sources and the light collecting device,
wherein
the diffractive element is of a combination type fabricated by combining two different raw materials at a combining plane which is shaped as a diffraction grating,
the light collecting means has an aberration corrected for the light at the first wavelength λ1.

* * * * *

UNITED STATES PATENT AND TRADEMARK OFFICE
CERTIFICATE OF CORRECTION

| | |
|---|---|
| PATENT NO. | : 7,075,865 B2 |
| APPLICATION NO. | : 10/461048 |
| DATED | : July 11, 2006 |
| INVENTOR(S) | : Sumito Nishioka et al. |

It is certified that error appears in the above-identified patent and that said Letters Patent is hereby corrected as shown below:

<u>Title Page</u>
Item (73) The spelling of Assignee's name is corrected to "Sharp Kabushiki Kaisha."

Signed and Sealed this

Seventeenth Day of October, 2006

JON W. DUDAS
*Director of the United States Patent and Trademark Office*